(12) United States Patent
Thomas, III (10) Patent No.: US 6,324,026 B1
(45) Date of Patent: Nov. 27, 2001

(54) READABLE INDELIBLE MARK ON STORAGE MEDIA

(75) Inventor: Fred C. Thomas, III, Ogden, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/149,678

(22) Filed: Sep. 9, 1998

Related U.S. Application Data (60) Provisional application No. 60/091,453, filed on Jul. 1, 1998.

(51) Int. Cl.⁷ .................................................. G11B 5/09
(52) U.S. Cl. .................... 360/49; 360/77.03; 360/78.11; 360/135; 360/69; 369/14
(58) Field of Search ............................ 369/273, 274, 369/290, 289, 14; 360/77.03, 78.11, 131, 135, 48, 69, 49, 77, 8, 78.14

(56) References Cited

U.S. PATENT DOCUMENTS

| | | |
|---|---|---|
| 3,889,272 | 6/1975 | Lou et al. . |
| 4,584,641 | 4/1986 | Guglielmino . |
| 4,814,928 | 3/1989 | Ito et al. . |
| 4,924,287 | 5/1990 | Orbach . |
| 4,940,508 | 7/1990 | Shamouilian et al. . |
| 4,961,123 * | 10/1990 | Williams et al. ............. 360/77.03 X |
| 5,062,021 | 10/1991 | Ranjan et al. . |
| 5,078,771 | 1/1992 | Wu . |
| 5,108,781 | 4/1992 | Ranjan et al. . |
| 5,220,476 | 6/1993 | Godwin et al. . |
| 5,362,941 | 11/1994 | Johnson et al. . |
| 5,363,255 * | 11/1994 | Ivers et al. .................... 360/14 X |
| 5,400,319 | 3/1995 | Fite et al. . |
| 5,419,733 | 5/1995 | Johnson et al. . |
| 5,476,100 | 12/1995 | Galel . |
| 5,535,069 * | 7/1996 | Chiao et al. ..................... 360/135 X |
| 5,572,589 | 11/1996 | Waters et al. . |
| 5,595,768 | 1/1997 | Treves et al. . |

FOREIGN PATENT DOCUMENTS

| | | |
|---|---|---|
| 37 20 233 A1 | 12/1988 | (DE) . |
| 38 28 573 A1 | 3/1990 | (DE) . |
| 0 149 015 A2 | 7/1985 | (EP) . |
| 0 174 472 A2 | 3/1986 | (EP) . |
| 2 137 533 A | 10/1984 | (GB) . |
| 2 263 808 A | 8/1993 | (GB) . |
| 8703032 | 7/1989 | (NL) . |
| WO 93/21582 | 10/1993 | (WO) . |

OTHER PUBLICATIONS

Microsoft Press Computer Dictionary, p. 310, published Dec., 1991.*

* cited by examiner

*Primary Examiner*—Alan T. Faber
(74) *Attorney, Agent, or Firm*—Woodcock Washburn Kurtz Mackiewicz & Norris LLP (57) ABSTRACT

A storage media is disclosed and comprises a storage body and a readable indelible mark formed in the body such that portions thereof are indelibly altered. The mark is read by writing first data to the body in the region of the mark, and reading second data from the body in such region. The written first data is not accepted where the portions of the body are indelibly altered. Accordingly, the read second data corresponds to the written first data with segments thereof missing. The missing segments of the first data correspond to the portions of the body indelibly altered. In a preferred embodiment, the storage media comprises a magnetic rotatable disk having a substantially planar substrate and a magnetizable layer deposited thereon. The reading and writing are therefore performed magnetically.

18 Claims, 4 Drawing Sheets

FIG. 12

READABLE INDELIBLE MARK ON STORAGE MEDIA

CROSS-REFERENCE TO RELATED APPLICATION

This application claims the benefit of U.S. Provisional Application No. 60/091,453, filed Jul. 1, 1998 and entitled "DISK INDELIBLE UTILITY MARK".

FIELD OF THE INVENTION

The present invention relates to a machine-readable indelible identifying mark on a storage media. More particularly, the present invention relates to such an indelible mark ablated or otherwise imprinted into a storage media such as a magnetic storage media, wherein the mark is read by detecting the absence of portions of such media.

BACKGROUND OF THE INVENTION

As part of the present invention, the inventors thereof have discovered that it is highly useful to indelibly mark or identify a storage media, such that the marking/identification cannot be modified, removed, or otherwise altered, and such that the mark can be relatively easily read. Such an identification can for example be unique or non-unique, and can for example signify that the media is read-only, write-once, has some other specific characteristic, or the like. Additionally, the identification may signify that the media is from a specific vendor, for a specific type of drive or device, for use with a specific vendor's software or firmware, or the like.

Moreover, such identification may signify that the media has a pre-defined disk storage capacity, a pre-defined purpose, or contains a pre-determined type of application. Further, the mark may signify a security key or a portion thereof which in combination with another portion obtained elsewhere allows access to the information on the media. In short, such identification may have any identifying purpose while still being within the spirit and scope of the present invention as described below.

One way to create such an identification on such storage media is to construct an identification file and store such file on the media. However, and as should be understood, such an identification is easily alterable simply by accessing and modifying the identification file with readily available reading/writing equipment.

Another way to create such an identification on such storage media is to print, stamp, or otherwise create an identifying mark on a sleeve or cartridge or the like within which the media resides. However, such identifying mark may likewise be altered, by replacing the sleeve or cartridge or the like. Moreover, such an identifying mark is not preferred because the drive reading the media likely requires additional hardware specifically for reading the identifying mark on such sleeve or cartridge or the like.

Accordingly, a need exists for an identifying mark that is formed inseparably from the media, where such mark cannot be altered. Moreover, a need exists for such an identifying mark that is formed on the media itself, where a drive reading the media need not require additional hardware specifically for reading such mark.

SUMMARY OF THE INVENTION

The present invention satisfies the aforementioned need by providing a storage media comprising a storage body and a readable indelible mark formed in the body such that portions thereof are indelibly altered. The mark is read by writing first data to the body in the region of the mark, and reading second data from the body in such region. The written first data is not accepted where the portions of the body are indelibly altered. Accordingly, the read second data corresponds to the written first data with segments thereof missing. The missing segments of the first data correspond to the portions of the body indelibly altered.

In one embodiment of the present invention, the storage media comprises a magnetic rotatable disk having a substantially planar substrate and a magnetizable layer deposited thereon. The reading and writing are therefore performed magnetically.

BRIEF DESCRIPTION OF THE DRAWINGS

The foregoing summary, as well as the following detailed description of various embodiments of the present invention, will be better understood when read in conjunction with the appended drawings. It should be understood, however, that the invention is not limited to the precise arrangements and instrumentalities shown. In the drawings.

DETAILED DESCRIPTION OF PREFERRED EMBODIMENTS

Certain terminology may be used in the following description for convenience only and is not considered to be limiting. The words 'left', 'right', 'upper', and 'lower' designate directions in the drawings to which reference is made. The words 'inwardly' and 'outwardly' are further directions toward and away from, respectively, the geometric center of the referenced object. The terminology includes the words above specifically mentioned, derivatives thereof, and words of similar import.

Figure 1:
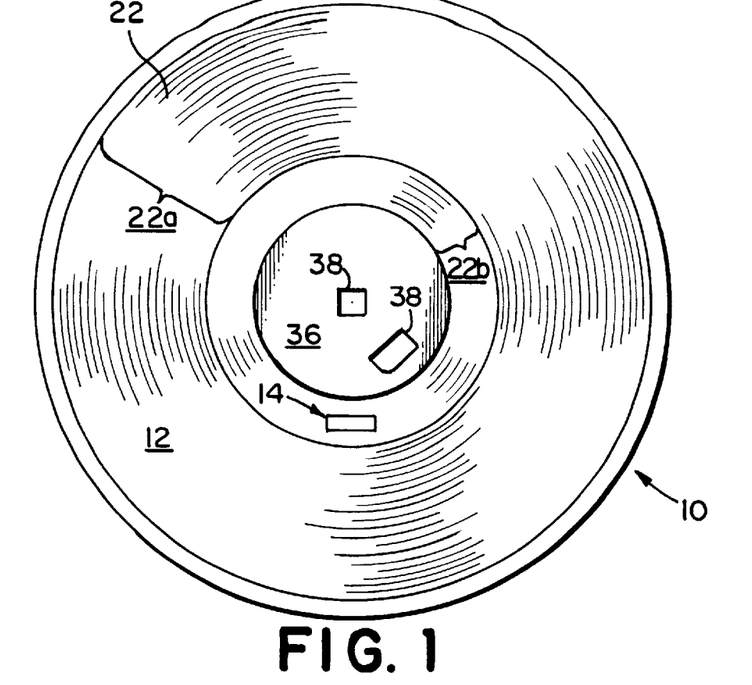
FIG. 1 is a plan view of a storage media having a readable indelible mark formed thereon in accordance with one embodiment of the present invention.
Figure 4:
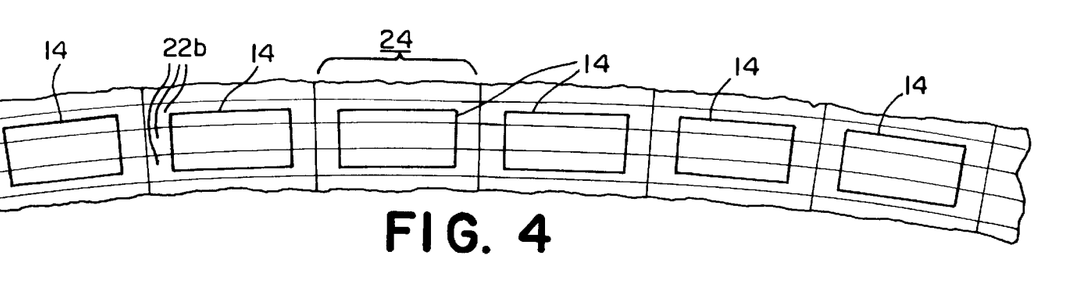
FIG. 4 is a plan view of a plurality of marks arranged on the media of FIG. 1 in accordance with one embodiment of the present invention.
Figures 5, 6, 7:
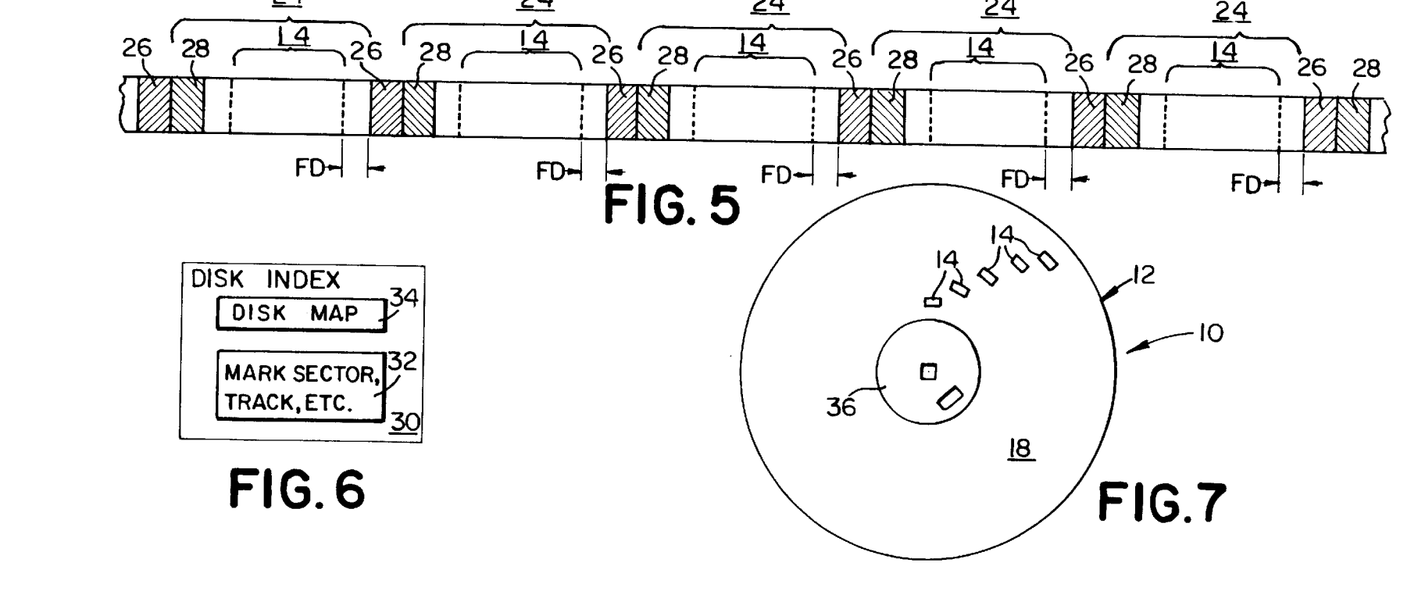
FIG. 5 is a schematic view of an arrangement of the marks of FIG. 4 with respect to tracks and sectors of the media of FIG. 1.
FIG. 6 is a schematic view of a disk index stored on the media of FIG. 1.
FIG. 7 is a plan view of a plurality of marks arranged on the media of FIG. 1 in accordance with another embodiment of the present invention.

Referring to the drawings in detail wherein like numerals are used to indicate like elements throughout, there is shown in FIG. 1 a storage media 10 comprising a storage body 12 and one or more readable indelible marks 14 (one is schematically shown in FIG. 1, more than one are schematically shown in FIGS. 4, 5, and 7) formed on the body 12 such that portions 20 of the body 12 are absent (i.e., removed, masked, or otherwise not present) or otherwise indelibly altered. As will be explained in more detail below, the mark 14 is read by detecting the absences/indelible alterations of such portions 20 from the body 12. Preferably, the storage media 10 is a magnetic storage disk which is spun past a read/write head of a drive 48 (FIG. 12) within which the disk 10 is inserted and/or resides. However, other types of media 10 may be employed without departing from the spirit and scope of the present invention. For example, the media 10 may be magnetic- or optical-based, may be removable or non-removable, and may be a tape, a flexible disk, or a hard disk, or the like.

The mark 14 is to be read by the drive 48 and/or by a data device 52 (FIG. 12) attached to such drive 48, such as a computer, a processor, or another type of data device. Any type of drive 48 or data device 52 may be employed without departing from the spirit and scope of the present invention. For example, the drive 48 may be a magnetic drive, an optical drive, or the like. Likewise, the data device 52 may be a digital camera, a hand-held electronic organizer, an electronic global positioning device, a hand-held game, etc.

Figure 2:
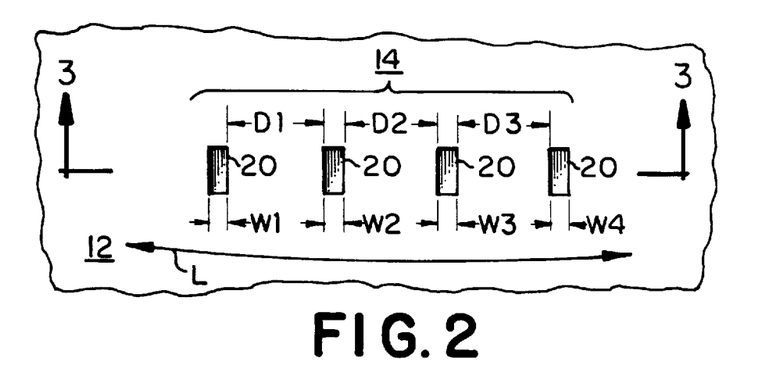
FIG. 2 is a more detailed view of the mark of FIG. 1 in accordance with the present invention.
Figure 3:
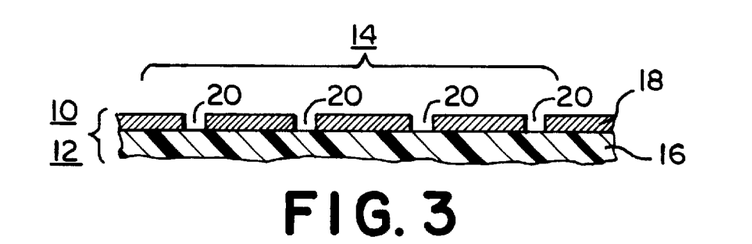
FIG. 3 is a cross-sectional view taken along the line 3—3 of FIG. 2, and shows the mark ablated into the surface of the media of FIG. 1.

In one embodiment of the present invention, and referring now to FIGS. 2 and 3, the rotatable disk 10 has a substantially planar substrate 16 and a magnetizable layer 18 deposited on such substrate 16 in a known manner, and the mark 14 is formed in the layer 18 such that portions 20 of the layer 18 are absent from the substrate 16 or are indelibly altered. Thus, the mark 14 is read by detecting the absences of such portions 20 from the layer 18/indelible alterations of such portions 20 of the layer 18. Preferably, the mark 14 is created by ablating the portions 20 of the layer 18 from the substrate 16.

Figure 2A:
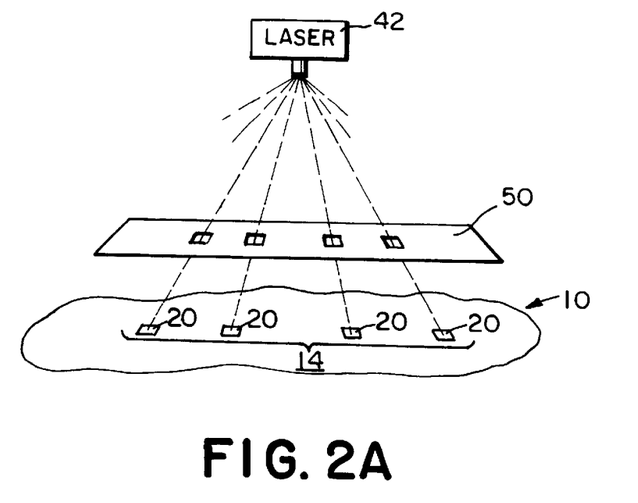
FIG. 2A is a diagrammatic view of a laser ablating the mark of FIG. 2.

Preferably, and as seen in FIG. 2A, such ablating is achieved by way of a laser 42 such as an excimer laser or the like which produces a short wavelength, high power output. Preferably, the laser 42 flashes through a pre-defined template 50 appropriately positioned over and imaged onto the disk 10, as shown. One or more appropriate lenses (not shown) may be employed in connection with the laser 42 and template 50 to focus the laser flash onto the disk 10. Multiple laser flashes may be necessary to ablate the mark 14 to a sufficiently deep level into the film 18 and disk 10. As should be understood, such laser flashing is similar to ultraviolet lithography.

Other methods of ablating the mark 14 may of course be employed without departing from the spirit and scope of the present invention. For example, another type of laser 42 may be employed to trace- or scan-etch the mark 14 without the aid of the template 50, ultraviolet lithography may be employed, or pin-point chemical etching may be employed, among other things. As another alternative, the layer 18 may be deposited on the substrate 16 of the disk in such a way as to form the absent portions 20 and mark 14. Accordingly, removal of such portions 20 of the layer 18 at a later time would not be necessary.

Typically, the magnetizable layer 18 is a magnetizable film 18 adhered to the substrate 16. However, it will be appreciated that any deposited magnetizable material may be employed as the layer 18 without departing from the spirit and scope of the present invention. Moreover, it will also be appreciated that any method of adhering the layer/film 18 to the substrate 16 may be employed without departing from the spirit and scope of the present invention.

Referring again to FIGS. 2 and 3, the absent portions 20 of the film 18 leave apertures 20 that extend along the surface of the disk 10 and that extend into the disk 10 from the surface toward the substrate 16. Preferably, such apertures 20 extend into the disk 10 and toward the substrate 16 a sufficient depth to remove substantially all of the film 18 from the floor of the aperture 20. Accordingly, the disk 10 in the region of each aperture 20 cannot magnetically store data. As mentioned above, multiple laser flashes may be necessary from the laser 42 shown in FIG. 2A to achieve such depth of ablation. Removal of less than all of the film 18 may also be performed if it can be shown that the remaining film 18 cannot magnetically store data in a manner sufficient to be magnetically read, and/or cannot be magnetically read due to spacing or other dimensional issues.

Still referring to FIGS. 2 and 3, the apertures 20 of the mark 14 preferably extend in a generally circumferential direction with respect to the disk 10, as shown by the line L in FIG. 2. Accordingly, with the read/write head of the drive 48 properly positioned, all of the apertures 20 may be rotated past such head in series. The apertures 20 may also be organized in other arrangements, such as extending both radially and circumferentially, without departing from the spirit and scope of the present invention. However, a series of apertures 20 extending radially cannot be rotated past a single drive head in series.

Preferably, each aperture 20 has a circumferentially extending angular width W1, W2, W3, etc., and each aperture 20 is separated from a neighboring aperture 20 by a circumferentially extending angular distance D1, D2, D3, etc. Accordingly, the mark 14 may be read at least in part by detecting the angular widths W1, W2, W3, etc. and/or the angular distances D1, D2, D3, etc. Of course, if the angular extent of the mark 14 is sufficiently small, the angular dimensions become generally linear. Accordingly, the mark 14 as shown in FIGS. 2 and 3 is substantially linear, although it could instead be arcual.

Preferably, and referring now to FIG. 1, the film 18 on the disk 10 is formatted into a pre-determined number of substantially concentric and substantially circular tracks 22a, 22b (indicated by the radially extending arcual lengths in FIG. 1). Furthermore, and as seen in FIG. 4, each track 22a, 22b is preferably formatted into a predetermined number of substantially arcual track sectors 24. As should be understood, the number of tracks 22a, 22b and sectors 24 in each track 22a, 22b may vary without departing from the spirit and scope of the present invention. In one preferred embodiment of the present invention, each track 22a, 22b is about 8.3 micrometers in radial width, and each track 22a, 22b is divided into 120 equal sectors 24, each having three degrees of arc length.

As seen in FIG. 1, in one embodiment of the present invention, the tracks 22a, 22b of the disk 10 include data tracks 22a on which saved data is typically written, and utility tracks 22b which are used to store utility information, as well as to provide overshoot areas and other utility functions. As seen, the utility tracks 22b are interior to the data tracks 22a. Preferably, the mark 14 is positioned out of the way of the data tracks 22a, and on one or more of the utility tracks 22b. However, other arrangements may be employed without departing from the spirit and scope of the present invention.

Preferably, and as seen in FIGS. 4 and 5, a plurality of marks 14 are positioned on the disk 10. Each mark 14 is positioned on at least one of the track sectors 24, and more preferably on a single track sector 24 of a track 22b. As should be understood, then, each mark 14 is relatively small, and extends over only about 1 to 2.5 degrees of arc length. In one embodiment of the present invention each mark 14 extends about 80 to 220 micrometers in arcual (almost linear) length. Also preferably, each mark 14 extends radially about the radial width of three tracks 22b, or about 25 micrometers. Accordingly, and as seen in FIG. 4, a single mark 14 extends over several tracks 22b (each mark 14 is shown as extending radially about 2–2.5 tracks in FIG. 4). As will be explained below, by extending each mark 14 over multiple tracks 22b, a preferred track 22b may be selected.

In one embodiment of the present invention, and as seen in FIG. 5, the disk 10 is formatted such that each track sector 24 is separated from each adjacent track sector 24 by a dividing field 26. Preferably, the dividing field 26 is a servo field servo-written onto the disk 10 during manufacturing and formatting of the disk 10. Such servo-writing is known and therefore need not be further described in the present disclosure. Other methods of creating the dividing fields 26 may be employed without departing from the spirit and scope of the present invention. As was discussed above, each mark 14 is preferably positioned on a single track sector 24 between the dividing fields 26 of such single track sector 24, as is shown in FIG. 5. As will be described below, the dividing fields 26 are preferably created after each mark 14 is formed on the disk 10, and with respect to such mark 14. Accordingly, each mark 14 does not inadvertently interfere with a dividing field 26.

As seen in FIG. 5, in one embodiment of the present invention, each track sector 24 also includes an identifying field 28. As shown, such identifying field 28 is immediately adjacent a dividing field 26 for the track sector 24. As is known, the identifying field 28 can contain information to identify the track sector 24, a group of track sectors 24 (for example, a data sector comprising 5 track sectors 24), or the like. In addition or in the alternative, the identifying field 28 may be employed as a re-synchronizing device when reading from and writing to the disk 10. As should be understood, then, it is preferable that each mark 14 be positioned on the single track sector 24 at an area other than the identifying field 28. Accordingly, and once again, each mark 14 does not inadvertently interfere with the identifying field 26.

In one embodiment of the present invention, the disk 10 includes a disk index 30, as is seen in FIG. 6. Typically, the disk index 30 is stored on the disk 10 in a known area. As should be understood, the disk index 30 is consulted when the drive 48 (FIG. 12) reads/writes the disk 10 to determine where to locate a file stored on the disk 10 and/or where to write a file onto the disk 10. Therefore, the disk index 30 includes sector and track information 32 identifying the sector(s) 24 and track(s) 22a, 22b where each file on the disk 10 is located. Preferably, the disk index 30 also includes sector and track information 32 identifying the sector(s) 24 and track(s) 22a, 22b where each mark 14 is positioned. The method for identifying such sector(s) 24 and track(s) 22a, 22b will be discussed below.

Typically, the disk index 30 also includes a disk map 34 having disk features stored therein. For example, such disk features can include bad sectors, physical disk defects, etc. In one embodiment of the present invention, one of the marks 14 on the disk 10 is employed as a 'hard index' with respect to all other areas on the disk 10, such that each disk feature is mapped in the disk map 34 with reference to the 'hard index' position of such mark 14. For example, if such mark 14 is at track X and track sector Y, a disk feature such as a bad sector may be identified as being X+A tracks and Y+B track sectors away from such mark 14. Of course, any of a variety of index systems may be employed, and any of a variety of disk features may be mapped, without departing from the spirit and scope of the present invention.

As seen in FIGS. 4, 5, and FIG. 7, and as was discussed above, the disk 10 may have a plurality of marks 14 formed in the film 18. For example, and as shown in FIG. 4, the marks 14 may be arranged in a sequentially angularly incremented fashion, where the marks 14 extend along a circumferential line. In addition, and as seen in FIG. 7, the marks may be arranged in a sequentially radially incremented fashion such that the marks 14 'stair-step' toward the outer edge of the disk 10. As should be understood, employing a plurality of the marks 14 on the disk 10 is useful in several respects. For example, if the marks 14 are all identical, a 'best' one of the marks 14 may be selected as the preferred mark 14. In addition, if the preferred mark 14 goes 'bad' or is otherwise un-readable, another mark 14 is likely available as a back-up mark 14.

Of course, the marks 14 may differ in any of a variety of ways for any of a variety of purposes. For example, two (or three, or four, etc.) differing marks 14 may combine to form an identifier, and such group of marks 14 may repeat one or more times on the disk 10. Any combination of marks 14, whether differing or identical, may be employed without departing from the spirit and scope of the present invention. Preferably, in the event the disk 10 has multiple marks 14, the disk index 30 includes sector and track information 32 for each mark 14, and also whether any mark 14 is 'bad'.

In one embodiment of the present invention, and as seen in FIG. 4, six identical marks 14 are positioned on adjacent track sectors 24 of a track 22b. As seen, each mark 14 in FIG. 4 has a radial width of approximately three track widths such that each mark appears on more than one track 22b. In such preferred embodiment, each mark 14 is at a radius of about 10.5 to 11.5 millimeters on the disk 10, and has a radial width of about 25 micrometers. Preferably, each mark 14 is no longer than about 80 to 85% of the arcual length of a track sector 24, or about 200 to 220 micrometers.

If, with regard to FIG. 5, it is assumed that the disk 10 is spun to the left, the leading edge of each feature on the disk 10 is to the left, and the trailing edge is to the right. In one embodiment of the present invention, then, each mark 14 is synchronized with respect to the dividing (servo) field 26 to the right such that such mark 14 is positioned to avoid ruining the identifying field 28 to the left. In particular, and as seen in FIG. 5, for each mark 14, the trailing (right) edge of such mark 14 and the leading (left) edge of the dividing (servo) field 26 to the right of such mark 14 are spaced apart a fixed distance FD of approximately 20 to 25 micrometers. If it is assumed that the minimum distance from the trailing (right) edge of the identifying field 28 to the leading (left) edge of the next dividing (servo) field 26 to the right is about 250 to 260 micrometers, each mark 14 then has clearance from the trailing (right) edge of the identifying field 28 to the left. Of course, other arrangements for positioning each mark 14 with respect to the disk 10 may be employed without departing from the spirit and scope of the present invention, and the disk 10 and mark 14 thereon may also be designed to spin to the right without departing from the spirit and scope of the present invention.

In one embodiment of the present invention, and again referring to FIGS. 2 and 3, each mark 14 has four apertures 20, where each aperture width W1, W2, W3, W4 is fixed at a constant value of about 10 to 11 microns, and where the angular distances D1, D2, D3 between the apertures 20 are varied. Preferably, such varying distances D1, D2, D3 represent corresponding values, and an identifying code is obtained from such corresponding values. In particular, in one embodiment of the present invention, the distances D1, D2, D3 represent most significant, middle, and least significant digits, respectively.

Preferably, the angular distances D1, D2, D3 each vary among 14, 28, 42 or 56 micrometers, where such lengths represent corresponding values of 0, 1, 2, or 3, respectively. The distances D1, D2, D3 therefore represent a base-4 identifying code from 000 to 333. For example, if D1, D2, and D3 are 42, 14, and 28 micrometers, respectively, the corresponding values would be 2, 0, and 1, respectively, and the identifying code would be 201 in base-4, or 17 in base-10. Based on the aforementioned mark architecture, 64 different marks 14 are available, and each mark 14 has a minimum arcual length of about 84 micrometers (000) and a maximum arcual length of about 210 micrometers (333). Variations on the aforementioned architecture, as well as any other identifying code architecture, may be employed without departing from the spirit and scope of the present invention.

Referring again to FIG. 4, it is seen that the six marks 14 shown are arranged in a slight curving pattern corresponding to the curve of the tracks 22b shown. However, as shown in FIG. 2, each individual mark 14 is not necessarily likewise curved. As was discussed above, such curving for each individual mark 14 is not believed to be necessary in most instances, especially if the angular extent of the mark 14 is sufficiently small such that the angular dimensions become generally linear. However, such curving may be provided without departing from the spirit and scope of the present invention.

Figure 12:
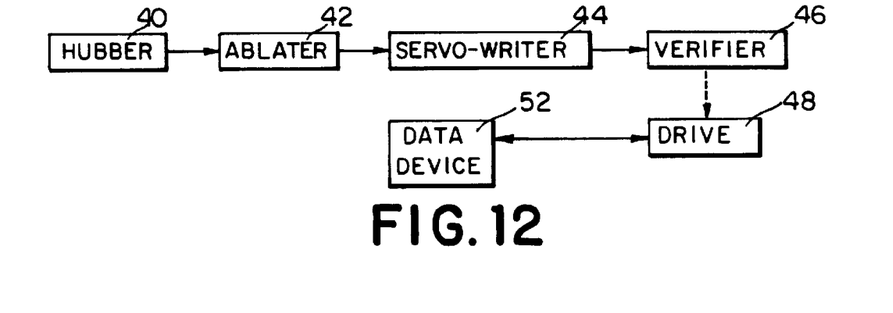
FIG. 12 is a block diagram showing the elements employed to produce the mark on the disk of FIG. 1.

With the mark 14 on the media/disk 10 as shown in the drawings, such mark is read in the following manner. Preliminary, the disk 10 is inserted into a drive 48 (FIG. 12). In one embodiment of the present invention, and as will be discussed in more detail below, the drive 48 need not have any special hardware modifications to read the mark 14. However, the drive 48 requires firmware for such purpose. Such firmware will be apparent from the discussion below and therefore need not be specified or discussed in any detail.

Figure 8:
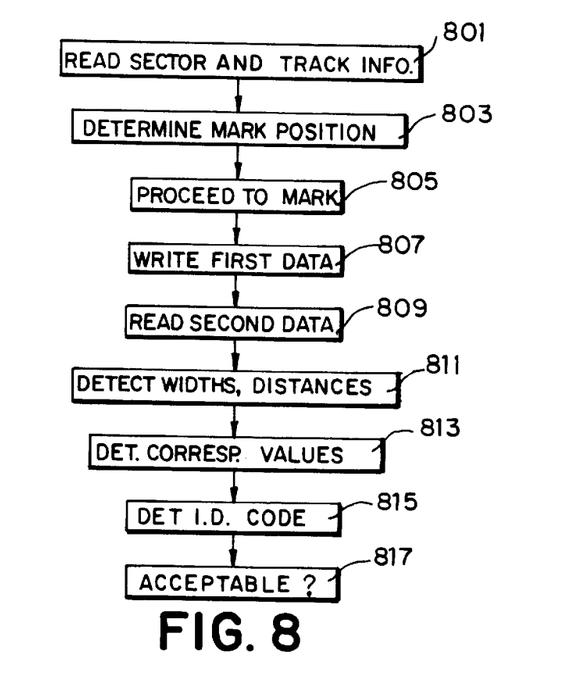
FIGS. 8–10 are flow diagrams showing methods for reading (FIG. 8), creating (FIG. 9), and finding (FIG. 10) the mark of FIG. 1.

Once the disk 14 is inserted into the drive 48, the drive 48 typically performs normal initial functions. Such functions include, but are not limited to: power on confidence tests; host and drive communication initialization; disk/media boot-up; and disk information acquisition, including information such as media defects, etc., among other things. In addition, and referring now to FIG. 8, the drive 48 proceeds to the disk index 30 (FIG. 6) where the sector and track information 32 identifies the sector(s) 24 and track(s) 22b where the mark(s) 14 is/are stored. The drive 48 then reads such identifying sector and track information 32 from the disk index 30 (step 801), determines the position of the mark(s) 14 from such information 32 (step 803), and proceeds to the position of one of the mark(s) 14 (step 805).

Figure 11:
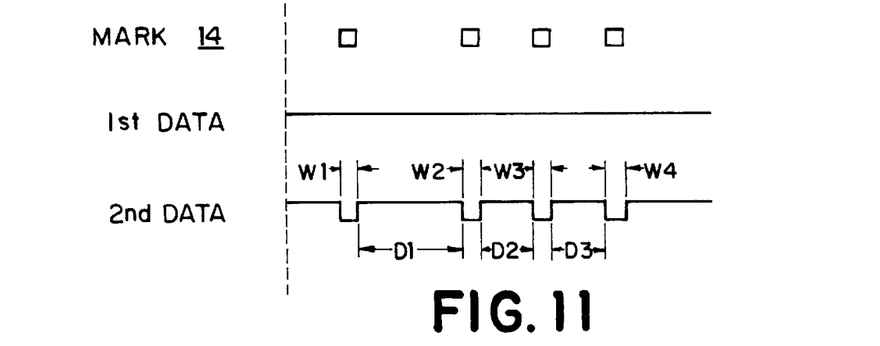
FIG. 11 is a timing diagram showing reading of the mark of FIG. 1.

Once at the position of the mark 14, the drive 48 then magnetically writes first data (FIG. 11) to the track sector 24 having the mark 14 (step 807). However, since the mark 14 includes apertures 20 (FIGS. 2 and 3) that cannot record written data for lack of the magnetic film 18, such written first data is not accepted in the area of the mark 14 where such apertures 20 are present. Thereafter, the drive magnetically reads second data (FIG. 11) from the track sector 24 having the mark 14 (step 809). As should be understood, and as seen in FIG. 11, the read second data corresponds to the written first data, except that segments of the written first data are missing. Such missing segments of the first data correspond to the apertures 20 of the mark 14, where the film 18 is missing from the substrate 16.

As seen in FIG. 11, the second data can be decoded to detect the angular widths W1, W2, W3, W4 corresponding to each aperture 20 in the mark 14, and can also be decoded to detect the angular distances D1, D2, D3 that separate each aperture 20 in the mark 14. In particular, the second data is preferably converted from a time-based form into distances in a straight forward manner based on the temporal positions of the apertures 20. Thereafter, the angular distances D1, D2, D3 are decoded to their corresponding values (step 813), and an identifying code is then determined from such values (step 815). The drive can then ascertain whether the determined identifying code is acceptable (step 817).

Any reasonable first data may be employed without departing from the spirit and scope of the present invention. For example, the first data may comprise a repeating bit pattern such as (11111111 . . . ). Alternatively, the bit pattern may be, (10101010 . . . ), (1001001001 . . . ), (1000100 01 . . . ), (11001100 . . . ), (111000111 . . . ), (1111000011 11 . . . ). etc. Preferably, the bit pattern is selected so as to have an acceptable resolution. That is to say, a bit pattern such as (100000000010000000001 . . . ) likely has a poor resolution since the transition to/from an aperture 20 can occur at any of 9 zero bits. Correspondingly, (100100100 10 . . . ) likely has a good resolution, and (10101010 . . . ) has a better resolution. While (11111111 . . . ) has the best resolution, such pattern may not be useful in all drives 48, since some drives 48 may assign a value of one to a bit 'read' from an aperture 20. Correspondingly, in a drive 48 that assigns a value of zero to a bit 'read' from an aperture 20, a (00000000 . . . ) bit pattern would not be useful.

It should be noted that many drives 48 employ an automatic gain control (AGC) (not shown) in connection with reading data from a disk 10. As known, such AGC automatically increases gain if a signal is not being picked up by a read/write head. Accordingly, if such a read/write head encounters an aperture 20 of a mark 14, the AGC will automatically increase such gain until a signal is picked up when the aperture 20 has passed by. However, if the aperture has a large-enough angular width W1, W2, W3, etc., it is possible that the AGC can overload before a signal is picked up. To prevent such overloading, it is preferable that the angular width W1, W2, W3, etc. of each aperture 20 be below a pre-determined maximum value.

As was discussed above, the identifying code determined by the drive 48 is a 3 digit base-4 code. However, other numbers of digits and other base values may be employed without departing from the spirit and scope of the present invention. In one embodiment of the present invention, in connection with the 3 digit base-4 code, if the first digit is '0', the disk 10 is identified by the drive 48 as a generic readable/writeable disk 10; if the first digit is '1', the disk 10 is identified as a write-protected disk 10; and if the first digit is '3', the disk 10 is identified as a vendor-specific disk 10 ('2' in such embodiment being reserved for future use). The second and third digits likewise further differentiate the identification of the disk 10. As should be understood, the drive 48 accepts the disk only if the drive firmware allows it to do so based on the identifying code. For example, a drive 48 for a digital camera data device 52 (FIG. 12) may have drive firmware programmed to accept a disk 10 (step 817) only if the disk 10 has a mark 14 identifying a particular vendor. Any coding scheme may be employed without departing from the spirit and scope of the present invention. Further, any desired action may be taken by the drive 48 in response to the code, also without departing from the spirit and scope of the present invention.

Moreover, the purpose of the identifying code may vary, without departing from the spirit and scope of the present invention. For example, the code may be employed by the drive 48 to determine a disk storage capacity of the inserted disk 10, to specify a type of application on the disk 10, or to realize any other function an identifying code can perform. As a further example, the identifying code may form part of a security key such that the information on the disk 10 having such code may only be accessed by the drive 48 if the security key is correctly completed.

Figure 9:
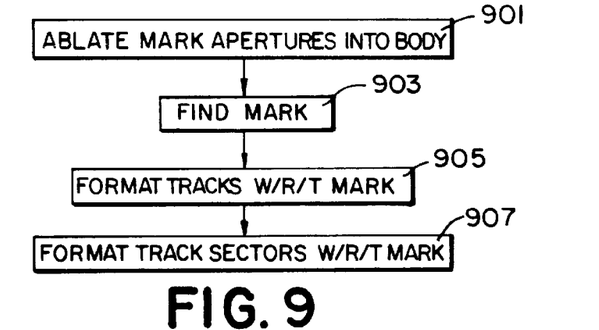
Figure 10:
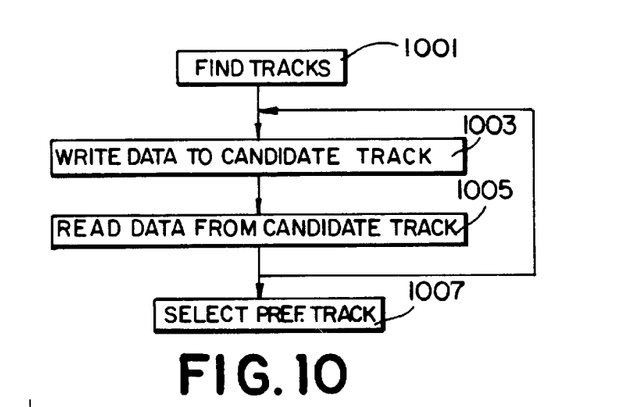

Referring now to FIGS. 9, 10, and 12, the steps and apparatus for producing the disk 10 having the mark 14 will be described. As was explained above, the mark 14 is formed on the disk 10 (step 901), preferably by ablation to form the apertures 20 in the body 12 of such disk 10. In one embodiment of the present invention, the mark 14 is formed on the disk 10 after a hub 36 (shown in FIG. 1) has been installed into the disk 10 by a hubber 40. The structure and operation of a hubber 40 is known and therefore need not be further described here. Preferably, the hub 36 has one or more apertures 38 (also shown in FIG. 1) keyed to align the disk 10 in the drive 48 and therefore provide a position datum on the disk 10 with respect to such drive 48. Preferably, such alignment is better than ±50 micrometers in the radial direction.

Once the hub 36 has been inserted into the disk 10 by the hubber 40 and the mark 14 has been ablated onto the disk 10 by the ablater/laser 42, the disk 10 is thereafter placed on a servo-writer 44 in one embodiment of the present invention. As is known, the servo-writer 44 is employed to format the film 18 on the disk 10 into the tracks 22a, 22b and into the track (servo) sectors 24. As with the drive 48, the keyed apertures 38 in the hub 36 align the disk 10 in the servo-writer 44 and therefore provide a position datum on the disk 10 with respect to such servo-writer 44.

Preferably, the tracks 22a, 22b are formatted with respect to the mark 14 (step 905) and the track sectors 24 are also formatted with respect to the mark 14 (step 907) such that the mark 14 does not interfere with the dividing or identifying fields 26, 28, as was discussed above. Accordingly, in one embodiment of the present invention, the servo-writer 44 finds the ablated mark(s) 14 (step 903) prior to performing such formatting (steps 905 and 907). Of course, devices other than a servo-writer 44 may be employed to perform the aforementioned finding and formatting steps without departing from the spirit and scope of the present invention.

To find the mark(s) 14, and referring now to FIG. 10, the servo-writer 44 first finds the track(s) 22b where the mark(s) 14 is/are located (step 1001). In particular, in one embodiment of the present invention, it is at least roughly known on which track(s) 22b the mark(s) 14 should be found. Accordingly, a plurality of candidate tracks 22b are determined for the servo-writer 44 to examine. For each candidate track 22b, the servo-writer 44 preferably writes first data to such candidate track 22b (step 1003), and then magnetically reads second data from such candidate track 22b (step 1005). As should be understood, and referring to FIG. 11, the first data written by the servo-writer is not accepted in its entirety by a candidate track 22b if the mark(s) 14 is/are on such candidate track 22b. Accordingly, if the mark(s) 14 is/are in fact on such candidate track 22b, the second data read by the servo-writer 44 will correspond to the written first data, but will have segments thereof corresponding to the mark(s) 14 missing.

The process of writing data and reading data (step 1003 and step 1005) is repeated for each of the several candidate tracks 22b. Accordingly, after such writing and reading, the servo-writer 44 will likely have identified at least one track 22b having the mark(s) 14 (since the mark(s) 14 preferably extend radially over several tracks 22b). Thereafter, the servo-writer 44 selects one of the identified tracks 22b as the preferred track 22b (step 1007). As should be understood, in performing the steps in FIG. 10 to find the mark(s) 14, the servo-writer 44 also finds the arcual position(s) of the mark(s) 14 on the preferred track 22b. If positioned accurately enough, the mark(s) 14 once found may be employed as a check to verify alignment of the servo-writer 44 with respect to the disk 10.

Once the mark(s) 14 are found, the servo-writer 44 then formats the tracks 22 on the disk 10 with respect to the mark(s) 14 (step 907), and also formats the track sectors 24 on the disk 10 with respect to the mark(s) 14 (step 907). In particular, and with regard to the track sector 24, the servo-writer 44 preferably formats the dividing fields 26 with respect to the mark(s) 14 such that each mark 14 is positioned on a single track sector 24 between such dividing fields 26. In the case where multiple marks 14 are positioned on the disk 10 in the manner shown in FIGS. 4 and 5, the marks 14 are preferably ablated on the disk 10 and the servo-writer 44 preferably positions each dividing field 26 on the disk 10 such that the trailing (right) edge of each mark 14 is approximately the same distance from the leading (left) edge of the next dividing field 26 to the right.

If the mark(s) 14 are laser-ablated onto the disk 10, as is preferred, and if the disk 10 is not vacuum-chucked to be flat during such ablation, the mark(s) 14 may be employed to determine if the disk 10 exhibits any curling or other distortion out of specification. In particular, if the disk 10 does in fact exhibit such curling or other distortion and is not vacuum-chucked, the mark(s) 14 will likely be vertically outside of focus during ablation and will therefore be oversized. Accordingly, to determine disk flatness during disk manufacture, the mark(s) 14 may be measured for size, and if too large, the disk 10 can be rejected as distorted.

In one embodiment of the present invention, after being servo-written by the servo-writer 44, the disk 10 is verified by a verifier drive 46. As is known, the verification process examines the disk 10 for defects and the like, and identifies the defects in the disk index 30. Either the verifier 46 or the servo-writer 44 may note the location(s) of the mark(s) 14 in the sector/track information section 32 of the disk index 30 (FIG. 6). In addition, either the verifier 46 or the servo-writer 44 may find the 'best' mark 14 on the disk from among a plurality of marks 14, and note the best mark 14 in the disk index 30. Of course, other processes for finding the mark(s) 14, noting mark information in the disk index 30, and noting the best mark 14 in the disk index 30 can be employed without departing from the spirit and scope of the present invention.

In the present invention, an identifying mark 14 is formed directly on a media 10, where such mark 14 cannot be altered. Accordingly, such mark 14 indelibly identifies the media 10 to a media drive 48. Moreover, the drive 48 reading the media need not require additional hardware specifically for reading such mark 14. Although the media 10 has been described primarily in terms of a magnetic disk, the media 10 may instead be any other kind of readable/ writeable media without departing from the spirit and scope of the present invention, with appropriate modifications to the mark 14 et al. as may be necessary. It should be appreciated by those skilled in the art that changes could be made to the embodiments described above without departing from the inventive concepts thereof. For example:

Aside from ablation, and as was discussed above, the mark 14 may also preferably be created by indelibly altering the portions 20 of the film 18 on the substrate 16. For example, the laser 42 and template 50 shown in FIG. 2A may be employed to heat the portions 20 of the film 18 a sufficient amount such that the portions 20 permanently lose the ability to magnetically store data. As should be recognized, such heating requires less energy than ablation. Alternatively, the mark 14 may be embossed or stamped onto the disk 10. In such a situation, such stamping or embossing displaces the film 18 away from the drive head an appreciable distance (fractions of a micrometer), where such displaced film 18 is therefore unreadable by such drive head. It should therefore be understood that the term 'indelibly alter' and the like as used in the present specification and claims is intended to include indelible alterations created by ablation, stamping, embossing, heating, chemical treatment, and the like, wherein the portions 20 of the film 18 are either removed from the substrate 16 or otherwise changed, such that the portions 20 permanently lose the ability to magnetically store data. Likewise, it should be understood that the portions 20 may be apertures created by ablation or other removal techniques, or may instead may be indistinguishable from the surrounding film 18 if created by heating or other neutralization techniques. However, even if indistinguishable, such portions 20 should still have detectable circumferentially extending angular widths W1, W2, W3, etc., and be separated from each other by detectable circumferentially extending angular distances D1, D2, D3, etc.

By using the stair-step pattern of FIG. 7, another multiple mark pattern, or some variation thereof, the step of aligning of track sectors 24 with respect to mark(s) 14 during the servo-writing process may be dispensed with. This assumes that the marks 14 are arranged in the pattern so that at least one of such marks 14 will always fall squarely within a later-written sector 24 and therefore be usable. Such usable mark(s) 24 can then be located and indexed during the verify process.

As was discussed above, the mark 14 may be placed on a readable/writeable optical media 10, rather than a magnetic media 10. Such readable/writeable optical media 10 may for example be a phase-change media, such as DVD-RAM or the like.

It is understood, therefore, that this invention is not limited to the particular embodiments disclosed, but it is intended to cover modifications within the spirit and scope of the present invention as defined by the appended claims.

What is claimed is:

1. A magnetic storage media comprising a rotatable disk having a substantially planar substrate and a magnetizable layer deposited thereon, the disk including a readable indelible mark formed in the layer such that portions of the layer are absent from the substrate, the mark comprising a plurality of the portions sequentially arranged to form in combination an indicia permanently associated with the media, the mark being read by detecting the absence of such portions of the layer, the layer on the disk being formatted into a predetermined number of substantially concentric and substantially circular tracks, each track including a plurality of dividing fields and being formatted into a predetermined number of substantially arcual track sectors by the dividing fields, each track sector being defined as a portion of a track extending between immediately adjacent dividing fields thereof, the mark being positioned on a single track sector of a track.

2. The storage media of claim 1 wherein the absent portions of the layer are ablated from the substrate.

3. The storage media of claim 1 wherein the absent portions of the layer leave apertures that extend along a surface of the disk and that extend into the disk from the surface toward the substrate.

4. The storage media of claim 1 wherein the tracks include data tracks and utility tracks interior to the data tracks, and wherein the mark is positioned on a utility track.

5. The storage media of claim 1 wherein each track sector is separated from adjacent track sectors on the track by respective dividing fields, and wherein the mark is positioned on the single track sector between the dividing fields of the single track sector.

6. The storage media of claim 5 wherein each track sector includes an identifying field, and wherein the mark is positioned on the single track sector at an area other than the identifying field.

7. The storage media of claim 1 wherein the mark comprises a series of apertures extending in a generally circumferential direction, each aperture having a circumferentially extending angular width, wherein the mark is read at least in part by detecting such angular widths.

8. The storage media of claim 1 wherein the mark comprises a series of apertures extending in a generally circumferential direction, each aperture being separated from a neighboring aperture by a circumferentially extending angular distance, wherein the mark is read at least in part by detecting such angular distances.

9. A magnetic storage media comprising a rotatable disk having a substantially planar substrate and a magnetizable layer deposited thereon, the disk including a readable indelible mark formed in the layer such that portions of the layer are absent from the substrate, the mark comprising a plurality of the portions sequentially arranged to form in combination an indicia permanently associated with the media, the mark being read by detecting the absence of such portions of the layer, the layer on the disk being formatted into a predetermined number of substantially concentric and substantially circular tracks, each track including a plurality of dividing fields and being formatted into a predetermined number of substantially arcual track sectors by the dividing fields, each track sector being defined as a portion of a track extending between immediately adjacent dividing fields thereof, the mark being positioned on at least one of the track sectors of at least one of the tracks, the disk further having a disk index stored thereon on at least one of the tracks, the disk index including sector and track information identifying the sector(s) and track(s) where the mark is positioned.

10. The storage media of claim 9 wherein the disk index includes a disk map having disk features stored therein, each disk feature being mapped in the disk map with reference to the position of the mark.

11. The storage media of claim 9 wherein the absent portions of the layer are ablated from the substrate.

12. The storage media of claim 9 wherein the absent portions of the layer leave apertures that extend along a surface of the disk and that extend into the disk from the surface toward the substrate.

13. The storage media of claim 9 wherein the tracks include data tracks and utility tracks interior to the data tracks, and wherein the mark is positioned on a utility track.

14. The storage media of claim 9 wherein the mark comprises a series of apertures extending in a generally circumferential direction, each aperture having a circumferentially extending angular width, wherein the mark is read at least in part by detecting such angular widths.

15. The storage media of claim 9 wherein the mark comprises a series of apertures extending in a generally circumferential direction, each aperture being separated from a neighboring aperture by a circumferentially extending angular distance, wherein the mark is read at least in part by detecting such angular distances.

16. A magnetic storage media comprising a rotatable disk having a substantially planar substrate and a magnetizable layer deposited thereon, the disk comprising a plurality of marks formed in the layer such that portions of the layer are absent from the substrate, each mark comprising a plurality of the portions sequentially arranged to form in combination an indicia permanently associated with the media, each of the plurality of marks being read by detecting the absence of the portions of the layer of such mark.

17. The storage media of claim 16 wherein the marks are arranged in a sequentially angularly incremented fashion.

18. The storage media of claim 17 wherein the marks are arranged in a sequentially radially incremented fashion.

* * * * *